(12) United States Patent
Jeong

(10) Patent No.: US 6,393,060 B1
(45) Date of Patent: May 21, 2002

(54) VIDEO CODING AND DECODING METHOD AND ITS APPARATUS

(75) Inventor: Yeong-an Jeong, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/200,989

(22) Filed: Nov. 30, 1998

(30) Foreign Application Priority Data

Dec. 31, 1997 (KR) ............................................ 97/81038
Nov. 2, 1998 (KR) ............................................ 98/47239

(51) Int. Cl.[7] ............................................... H04N 7/12
(52) U.S. Cl. ................................. 375/240.19; 382/250
(58) Field of Search ............................ 375/240, 241.06, 375/240.11, 240.02, 240.13, 240.19; 382/232, 234, 236, 248, 250, 251, 240, 244, 245, 246; 348/699; H04N 7/12

(56) References Cited

U.S. PATENT DOCUMENTS

| | | | | |
|---|---|---|---|---|
| 5,412,741 A | * | 5/1995 | Shapiro | 375/240.11 |
| 5,477,272 A | * | 12/1995 | Zhang et al. | 375/240.06 |
| 5,764,805 A | * | 6/1998 | Martucci | 382/238 |
| 6,125,201 A | * | 9/2000 | Zador | 382/166 |
| 6,144,773 A | * | 11/2000 | Kolarov et al. | 382/240 |
| 6,229,929 B1 | * | 5/2001 | Lynch et al. | 382/268 |
| 6,236,762 B1 | * | 5/2001 | Chui et al. | 382/250 |

OTHER PUBLICATIONS

Amir Said et al., "A New, Fast, and Efficient Image Codec Based on Set Partitioning in Hierarchial Trees" *IEEE Transaction on circuits and Systems for Video Technology*, vol. 6, No. 12, Jun. 1996, pp. 243–250.

Jerome M. Shapiro, "Embedded Image Coding Using Zerotrees of Wavelet Coefficients", *IEEE Transactions on Signal Processing*, vol. 41, No. 12, Dec. 1993, pp. 3445–3462.

* cited by examiner

Primary Examiner—Nhon T Diep
(74) Attorney, Agent, or Firm—Fleshner & Kim, LLP

(57) ABSTRACT

An apparatus and method for video coding is disclosed wherein one frame is divided into a plurality of blocks. The present invention divides an input frame into a plurality of blocks and transforming the blocks to a frequency domain; rearranges the transformed frequency band-based coefficients in the order of priority based on a degree how much information required for image reproduction is included; and coding the information concerning the position and amplitude of the rearranged coefficients in the order of priority based upon significance and outputting the bit streams arranged according to the significance.

20 Claims, 7 Drawing Sheets

VIDEO CODING AND DECODING METHOD AND ITS APPARATUS

BACKGROUND OF THE INVENTION

1. Field of the Invention

The present invention relates to video signal coding and decoding, and more particularly an apparatus and method for coding and decoding low transfer rate video images.

2. Description of the Related Art

The international standards for a conventional video coding include the Joint Photographic Coding Experts Group (JPEG) for still picture coding/decoding, the Moving Picture Experts Group (MPEG) for motion picture coding/decoding, and the H.261 or H.263 for low transfer rate video coding/decoding. In response to an increasing demand for video communication over the existing Public Switched Telephone Network (PSTN), extensive studies have been made on the low bit video coding.

For example, the H.263 recommends the International Telecommunication Union-Telecommunication Standardization Sector (ITU-T, previously known as CCITT), which employs a motion compensated hybrid Differential Pulse Code Modulation/Discrete Cosine Transform (DPCM/DCT) coding method suitable to very low bit video transmission for realization of video telephone system. Particularly, the video coding method involves a DCT transformation and quantization of an input digital video signal; a restoration of the quantized video signal to detect a difference between the quantized video signal and the original video signal thereby estimating a motion; and a control of the quantizing step to attain a desired bit rate.

FIG. 1 is a block diagram showing a conventional motion picture coding apparatus based on DCT. The video coding is generally divided into an Intra (I) frame coding and a Predictive (P) frame coding. If an input video bit stream is an I frame, it is directly output to a DCT unit 101 without change. For a P frame, a difference between a motion-estimated data and the current input bit stream is output to the DCT unit 101 through the subtractor 110.

The DCT unit 101 eliminates the correlation of data by a dimensional coordinate transform. The DCT unit 101 decomposes the input frame in block units for the coordinate transform such that a portion of each picture block is transformed from a spatial domain to a frequency domain. Thus, the DCT transformed data are inclined to be driven in one direction towards the lower frequency band and are quantized at the quantizing (Q) unit 102. The quantization parameters such as a weight matrix and a quantization scale code are used for quantizing wherein the weight matrix indicates the weight of each DCT coefficient and the quantization scale code determines the quantizing step.

After quantization, each coefficient is output to an entropy coding unit 103, which performs a Variable Length Coding (VLC). Through the VLC, a frequently occurring value is represented by a smaller number of bits and an occasionally occurring value is represented by a larger number of bits, thereby reducing the entire number of bits to be transmitted to channel 104. The quantized data is also subjected to dequantization at a dequantizing unit 105 before an Inverse Discrete Cosine Transform (IDCT) at an IDCT unit 106. An adder 107 sums a motion-estimated data from a motion prediction unit 109 and the IDCT data, storing the summed value in a frame memory 108.

A continuous picture in a time axis usually includes a motion of a human or object in the center of the image. Based upon this idea, the motion prediction unit 109 eliminates redundancy by replacing an unchanged or similarly moving portion of the picture with the related portion of the previous picture. Thus, the amount of data to transmit is reduced to a large extent.

When the adder 107 stores the summed value in the frame memory 108, the data stored in the frame memory 108 forms the previous picture while the motion prediction unit 109 estimates the motion of a currently input picture. Motion estimation is performed by searching for the most similar blocks between the previous and current pictures, and a motion vector (MV) represents a degree of motion. The motion vectors are transmitted as well as the information concerning the VLC transform coefficients via the channel 104. The motion vectors also undergo VLC at the entropy coding unit 103 in order to attain a maximize the coding efficiency.

The MVs must first be obtained in order for the motion prediction unit 109 to perform a motion estimation. Up to four MVs are produced per one macro block, but only a difference between the current and previous MV is subjected to VLC for transmission because four MVs have a large number of bits to transmit. In the motion estimation, the motion prediction unit 109 uses forward and backward predicted blocks as well as involving two types of motion compensated frame.

The P frame is an estimated motion through the forward prediction and is used to predict the next P frame. The P frame is also usable for the forward and backward predictions of a bi-directionally (B) predicted frame. The B frame itself is not usable for prediction of other frames. On the other hand, an I frame is an image used as a criterion for performing an image compressive coding. Thus the original signals of an I frame is input to DCT transformation and quantization steps, thereby eliminating redundancy in spatial direction only.

The first frame is generally for I-frame coding, and when a transmission packet loss occurs, a transmitter may send an I frame at any other time by the request of a receiver. The I frame is used in the motion estimation for the P and B frames. Accordingly, the I frame coding also determines the coding efficiency for the following P and B frames. Especially, the background portion of the P frame image is not coded until the I-frame coding step has terminated and a scene change has occurred. As a result, the I-frame coding has an influence on the image quality. Thus, a better result of I-frame coding provides better coding of the subsequent P frame.

For the P frame coding, two coding steps are used with the input frames, namely a motion compensated prediction coding using a highly visible correlation between adjacent frames, and a displaced frame difference (DFD) coding involving an estimation error after performing a motion compensation. The DFD is the output of the subtractor 110, i.e. the signal difference between the current frame and the previous frame, the difference being as much as a motion vector. The DFD coding is the bulk of the P frame bits.

In most standardized coding, the DFD is coded in a same manner as the I frame video coding, which does not utilize the characteristic difference between a natural image and a DFD image. The difference arises because the DFD image has less spatial correlation, having much more mid and high frequency components compared to the natural image, including primarily smoothing regions. Thus, the DFD image provides a lower energy compression efficiency than the natural image, resulting in a deterioration of the overall efficiency in the run-length coding method using the existing zigzag scanning.

Furthermore, the number of DCT coefficients to be coded in low bit rate transmissions is too small. Yet, the coefficients are expressed by high quantizing levels, resulting in block and ringing effect.

Another issue of the motion picture coding is a bit rate control at the bit rate control unit 111. Because bits are generated by simply fixed quantizing parameters and coded by coefficients, a repetitive coding method is required to adjust to a specific target bit rate. Even though control is possible, an accurate bit rate control is hard to achieve.

The I-frame coding involves a structure for bit rate control by simply controlling the quantization step size (quantization parameter×2). Thus, the DCT error increases due to a large quantization distance in low bit rate transmissions, resulting in a continuous effect on the coding including motion estimation and compensation of P frames. As a result, the entire coding performance is deteriorated.

Moreover, the bits required for the I-frame coding when transmitting at a low bit rate (12–48 kbps) takes 40–70% of the total bits for transmission. Thus, an efficient coding of the I frame is essential to an enhancement of the entire coding performance. With the increasing demand for more efficient video coding, a concept of Embedded Zerotree Wavelet (EZW) was introduced recently which gave rise to many studies on the embedded zerotree video coding for still picture compression.

The EZW provides a bit rate distortion performance much more enhanced than the existing DCT-based video coders such as the JPEG. The embedded zerotree coding is widely used for the coding of wavelet transformed coefficients. A zerotree structure of wavelet coefficients is used to code position and amplitude information in the order of priority so that a bit stream may be obtained, arranged based on the significance of the bit stream.

The EZW method has an excellent compression performance, scalability characteristic of various resolution and image quality, and accurate bit rate control as well as a simple algorithm. The method allows a production of a good quality image at any given bit rate and an easy bit rate control, even when a bit stream transmission is suddenly interrupted at certain points in time. The primary characteristic of the embedded zerotree coding is in the interband prediction of the significant coefficient positions by utilizing a self-similarity of wavelet transform and a successive approximation quantization (SAQ) which approximates the amplitude of wavelet coefficient in succession. The schematic process of the embedded zerotree method will be described below.

Utilizing a wavelet transformation, an input image is first decomposed into subbands having different resolutions. The low frequency components of the original image are grouped into the most coarse subband while the high frequency components are grouped into the rest of subbands. The coefficients in each subband, excluding the highest frequency band, have a relationship with the coefficients having a similar direction in the next subband.

The coefficients in the most coarse subband is referred to as a "parent" and a set of coefficients in the other subbands at a position of the similar direction is called a "children." The parent node in the lowest frequency band has three children of different directions. The EZW produces a zerotree data structure from the parent-children relationship.

The zerotree structure assumes that if the wavelet coefficient in the most coarse band is lower than a given threshold, there is a high probability that the children of the wavelet coefficient are also low. Such a zerotree structure is very similar to the concept of zigzag scanning and End Of Block (EOB), generally used to code DCT coefficients. For example, the EZW involves the scanning of coefficients by bands.

Particularly, the children of a given parents are also scanned after scanning the neighboring parents within the band of the given parents. Each coefficient is compared with a current threshold. If the absolute value of a coefficient is larger than the threshold, the coefficient is coded into either one of a negative or a positive significance symbol. A zerotree root symbol is used to code parents whose children constitute a zerotree structure, wherein all children have a value below the threshold. An isolated zero symbol is used to code coefficients that have at least one children greater than the threshold.

The EZW involves a further coding using SAQ for the coefficients that are determined as significant information. The SAQ for quantizing the wavelet coefficients results in an embedded bit stream arranged in the order of priority based upon significant bits. Spatial data grouping and quantization are enabled in the EZW because the wavelet has both frequency and spatial information.

Another embedded video coder with an excellent compression performance is a Set Partitioning in Hierarchical Trees (SPIHT) using an improved zerotree coding method. The SPIHT coding method eliminates inter-coefficient redundancy by updating significant nodes with respect to a decreasing threshold. The SPIHT coding method is more efficiency than the EZW method because of an improved zerotree structure utilizing the characteristic of significant coefficients being primarily distributed in the lowest frequency band.

Although both the EZW and SPIHT methods may be effective in the coding of still picture for a high resolution image of 512×512, the methods are inappropriate for a low bit rate transmission video compression, performed usually at a relatively low resolution of 176×144. For example, in a Quarter Common Intermediate Format (QCIF), the coding efficiency is significantly reduced because a deterioration of the wavelet characteristics due to a deterioration of the zerotree coding efficiency. Also, an application of the EZW method to the DFD coding results in a lower overall efficiency relative to the DCT-based method because the break down of the wavelet-based pyramid structure does not reflect the reduced energy compression efficiency of the upper and mid level high frequency components.

Moreover, the DCT is a single transform and is relatively well-defined even with slight variations, while the wavelet may be one of various types including, but not limited to an Orthogonal, a biorthogonal, a wavelet packet, and a multi wavelet. Accordingly, there are many combinations of video coders, leading to a problem of selecting and designing a wavelet-based video coding and decoding apparatus.

Furthermore, a wavelet may be incompatible with the existing video coders considering that the 8×8 block DCT is used to code I frames and errors with a motion-compensated image, i.e. Displace Frame Difference (DFD), in most video compression standards for still pictures such as JPEG, MPEG (MPEG1, MPEG2 and MPEG4), H.261 and H.263.

SUMMARY OF THE INVENTION

Accordingly, an object of the present invention is to solve at least the problems and disadvantages of the related art.

An object of the present invention is to provide a video coding/decoding apparatus and method using DCT while maintaining the advantages of the embedded video coders.

Another object of the present invention is to provide a video coding/decoding apparatus and method designed to enhance the zerotree coding efficiency which is compatible with the existing DCT-based coders.

A further object of the present invention is to provide a DCT-based embedded video coding/decoding apparatus and method suitable to transmit an image at a low transfer rate.

A still further object of the present invention is to provide a DCT-based embedded video coding/decoding apparatus and method designed to enhance the coding efficiency of error signals with a motion-compensated image.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a video coding method according to the present invention includes the steps of: (1) decomposing an input frame into a plurality of blocks and transforming each block from a spatial domain to a frequency domain; (2) sorting and rearranging the frequency band-based coefficients transformed in step (1) in the order of significance priority based on a degree how much information required for image reproduction is included; (3) coding information concerning the position and amplitude of the coefficients rearranged in step (2) in the order of priority based upon significance and outputting bit streams arranged according to the significance.

A video coding apparatus of the present invention includes a transforming unit for decomposing an input frame into a plurality of blocks and transforming each block from a spatial domain to a frequency domain; a rearranging unit for sorting and rearranging the transformed coefficients in the order of significance priority based on a degree how much information required for image reproduction is included; and a zerotree coding unit for coding information concerning the position and amplitude of the rearranged coefficients in the order of priority based upon significance and outputting bit streams arranged according to the significance.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiment according to the present invention, examples of which are illustrated in the accompanying drawings. Generally, zerotree structures such as EZW and SPIHT commonly use the properties of a Decaying Spectrum corresponding to the inter-band spatial frequency characteristic in the wavelet transformation. Although there are some differences, the wavelets have common properties with the DCT. Thus, the DCT may be used in the embedded zerotree coding by appropriately rearranging the DCT coefficients.

The present invention enhances the efficiency of zerotree coding by rearranging the DCT coefficients in a 2-level zerotree structure using a wavelet decomposition or transformation by which 8×8 DCTs have 64 uniform frequency subbands. The result is a 2-level mapping method for DCT coefficients with an efficient zerotree structure and better image quality than the I frame coding method of H.263, the low transfer bit rate video compression standard. Also, the 2-level mapping method enhances rate distortion more than the EZW method using the Shapiro wavelet. Moreover, for the still picture compression, the 2-level mapping method provides an enhanced rate distortion comparable to the cited result of the JPEG and other typical wavelet embedded video coding apparatus.

Figure 1:
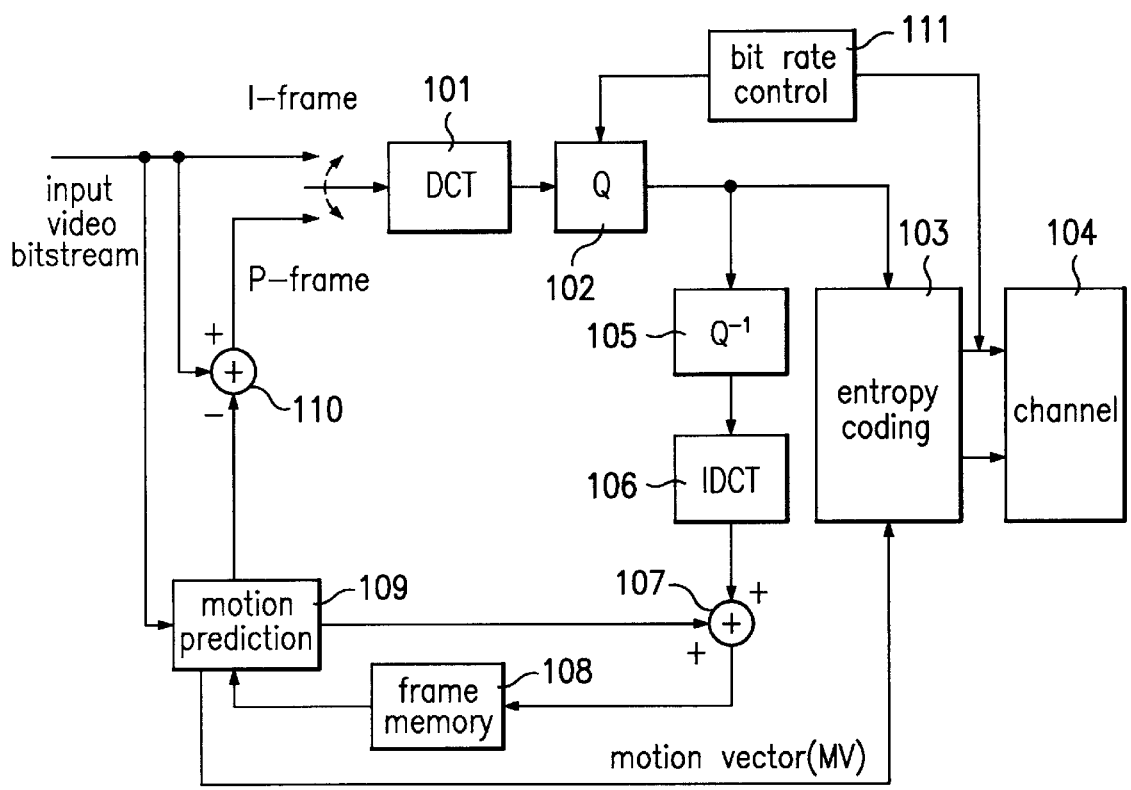
FIG. 1 is a block diagram of a conventional DCT based video coding apparatus in the related art.
Figure 2:
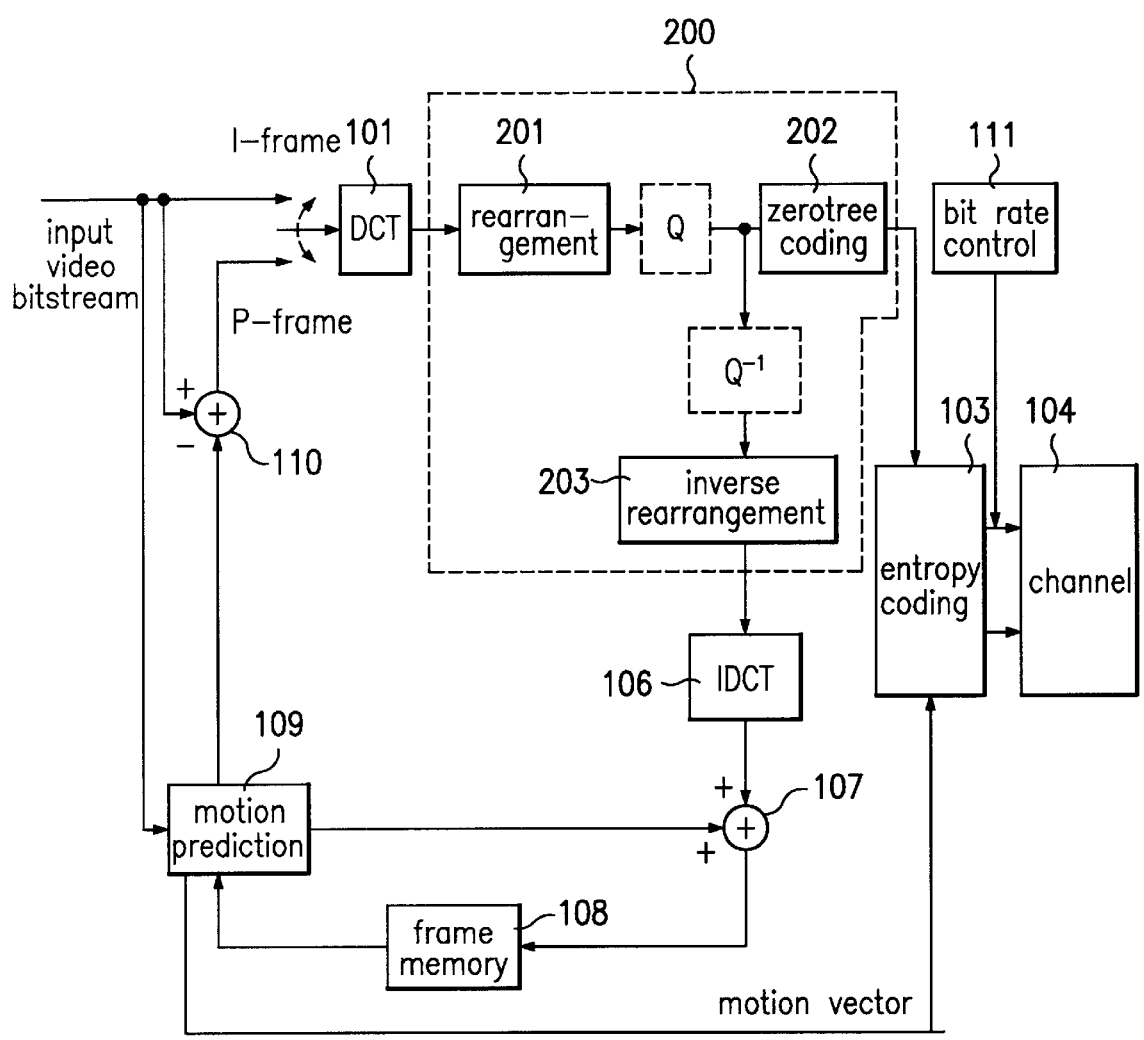
FIG. 2 is a block diagram of a video coding apparatus according to the present invention.

FIG. 2 is a preferred embodiment of a video coding apparatus according to the present invention. The present invention includes a DCT unit 101, an entropy unit 103, a channel 104, an IDCT 106, an adder 107, a frame memory 108, a motion prediction unit 109, a subtractor 110, and a bit rate control unit 111, the elements being analogous to the elements of the video coding apparatus of FIG. 1. The functions of the elements have been described with respect to FIG. 1 and will not be discussed. However, the present invention also includes a quantizer 200 incorporating the inventive concept of the present invention.

The quantizer includes a rearranging unit 201, a zerotree coding unit 202, and an inverse rearrangement unit 203. The embedded zerotree quantizer 200 gradually quantizes each coefficient with specified bits rather than using the traditional approach in which the coding is carried out by coefficients.

Each input video frame is coded as an intra frame for the first frame I and as an inter frame for the next frame P. The coding is performed in a macro block unit, and the brightness and color components are determined by a 4:2:0 format. For the I frame, the brightness Y and color components Cb and Cr of the first input picture are decomposed into 8×8 blocks, each block input to the DCT unit 101. The DCT unit 101 transforms the picture of each block from the spatial domain to the frequency domain to reduce spatial redundancy.

The DCT coefficients of each block from the DCT unit 101 are input to the rearrangement unit 201 and are rearranged into a 2-level pyramid structure. Particularly, the transformed DCT coefficients are sorted in the order of priority based upon significance and rearranged in a 2-level pyramid structure. The rearranged DCT coefficients are coded in an embedded zerotree structure at the zerotree coding unit 202. A SPIHT coding method may be used in this case. Each quantized coefficient is entropy-coded at the entropy coding unit 103 and transmitted through a channel 104.

On the other hand, the following successive frames of video sequence, for example P frames, are subjected to a motion estimation and compensation used in the H.263+ at the motion prediction unit 109. The video coding apparatus of the present invention selectively utilizes one of a block motion estimation, ANNEX D (Unrestricted Motion Vector Mode) or ANNEX F (Advanced Prediction Mode).

After motion prediction of each block, the residual errors are subjected to DCT at the DCT unit 101 and rearranged at the rearrangement unit 201 as the rest of the frames constituting the 2-level pyramid structure for quantization. If a rapid motion of an object causes an overlapping or exposed frictions of the picture or a scene change, the prediction of a macro block fails. In such case, coding the blocks of the original picture rather than the DFD results in a better coding efficiency and image quality. Accordingly, the present invention may code the original picture in certain circumstances.

In the intra coding, a given macro block is coded by using information of the macro block itself, but in inter coding, a given macro block is coded with information of the macro blocks from another time as well as the information of the macro block itself. Either the intra or inter mode is selected with reference to Equation 1 in a similar way to the mode determination in the H.263 coding apparatus.

$$MB_{mean} = \frac{\sum_{i=1,j=1}^{16,16} original}{256}$$ [Equation 1]

$$A = \sum_{i=1,j=1}^{16,16} |original - MB_{mean}|$$

Referring to Equation 1, if A<(SAD(x,y)−T), the intra mode is selected without performing motion estimation, wherein T is a given threshold value depending on the motion status of each block; $MB_{mean}$ is the average value of the macro blocks; A is a difference between each pixel and the average value for the macro blocks, i.e. the deviation of each pixel; and SAD is a difference with the previous frame at the same position. The intra/inter mode information is transmitted as an additional information such as H.263.

After DCT, the blocks in the intra mode have differences in the characteristic of the frequency spectrum from the blocks in the inter mode. One major difference being that the blocks in the intra mode have larger DC coefficients than the blocks in the inter mode. According to the present invention, the average value of the DCT coefficients of the intra blocks per each frame is subtracted from the DC coefficient. The DC coefficients are biased with a DC average to avoid wasting the number of bits in an unnecessary scanning due to large DC coefficient. The inter blocks may be rearranged without bias.

Subsequently, the DCT coefficients of the 2-level pyramid structure are quantized at the zerotree coding unit 202 using an embedded zerotree coding in the same manner as conducted in the I frame coding. The reason that the DCT coefficients are rearranged in a 2-level pyramid structure at the rearranging unit 201 is to associate the DCT with the embedded zerotree coding and to increase the mutual dependency of the space and frequency of the coefficients, thereby enhancing the embedded zerotree coding efficiency.

The rearrangement of DCT coefficients enables a coding of the quantized coefficients in the order from the most significant bit to the least significant bit. This enhances the efficiency of embedded zerotree coding by use of intra-band spatial dependency (spatial correlation of DC coefficients) and inter-band spatial dependency (decaying spectrum characteristic from lower frequency to higher frequency in one block).

Figure 3:
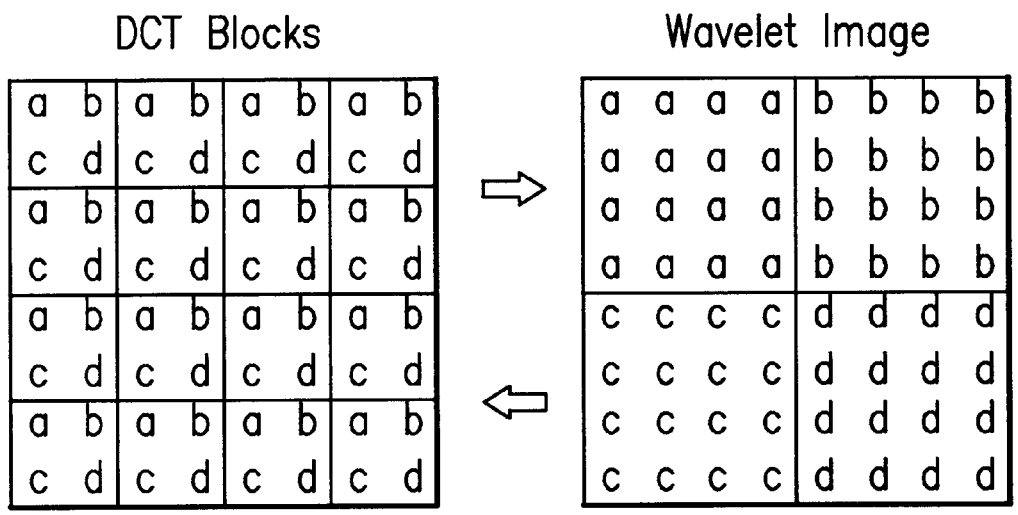
FIG. 3 is an illustration explaining the relationship between the DCT and the wavelet.

FIG. 3 shows the relationship of the DCT and the wavelet, wherein the wavelet transformation was used to decompose a picture into a plurality of portions, each portion band-pass filtered with a Finite Impulse Response (FIR) filter such as a Quadrature Mirror Filter (QMF). The process is similar to the decomposition of a basic function used in DCT. The one difference being in the method for constructing an output data. An accurate relationship is too complex to define due to a use of a filter longer than a subsampling factor. However, the DCT calculation for non-overlapped blocks is equivalent to convoluting both the DCT basic function of each block and picture, then subsampling them with a size of the block.

For a 2×2 block DCT, each transformed block has four types of transformation coefficients from a (the lowest frequency) to d (the highest frequency) as shown in the DCT blocks of FIG. 3. The picture decomposed by an appropriate 2×2 decomposition filter and subsampled by 2 in each direction is equivalent to the transformed block of the wavelet image of FIG. 3. In the wavelet image, the highest subband (low-pass/low-pass) is same as a group of the lowest frequency components of each DCT transformed block. The rest of the transformed coefficients are gathered in a similar manner to the other subbands.

Figure 4:
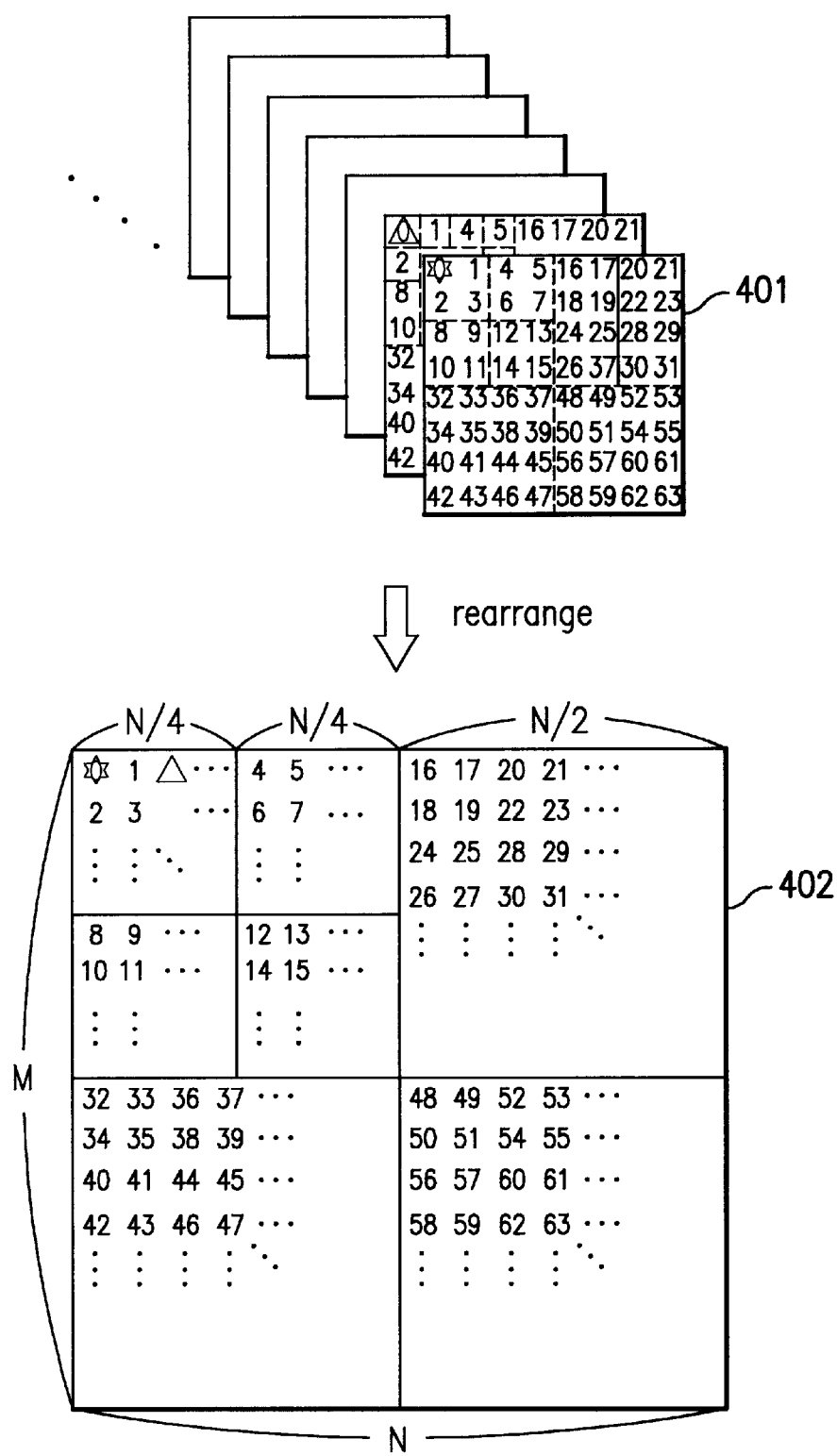
FIG. 4 is an illustration explaining the rearranged DCT coefficients in a 2-level pyramid structure.

To extend this concept, a 8×8 block DCT may be understood as a wavelet transformation with 64 uniform decomposed subbands. According to the present invention, DCT coefficients are rearranged in a 2-level zerotree structure by a wavelet decomposition called a wavelet transform with 64 uniformly decomposed subbands. FIG. 4 is a diagram illustrating the process for rearrangement of DCT coefficients in a 2-level pyramid structure. In the figure, the reference numeral 401 denotes a DCT coefficient and the reference numeral 402 indicates a DCT coefficient rearranged in a 2-level pyramid structure.

The rearrangement unit 201 considers each of the 8×8 DCT blocks in the form of a 3-level wavelet pyramid structure defined in the EZW. The positions corresponding to the respective coefficients are numbered in order to explain a parent-children relationship showing the spatial correlation of the coefficients. If coefficient i is a digit ranging from 1 to 63, the parent of coefficient i is a positive number given by i/4. If coefficient j is a digit ranging from 1 to 15, the children of coefficient j belongs to {4j, 4j+1, 4j+2, 4j+3}. The DC coefficient 0 is the root of a tree having three children of coefficients 1, 2 and 3.

Figure 5:
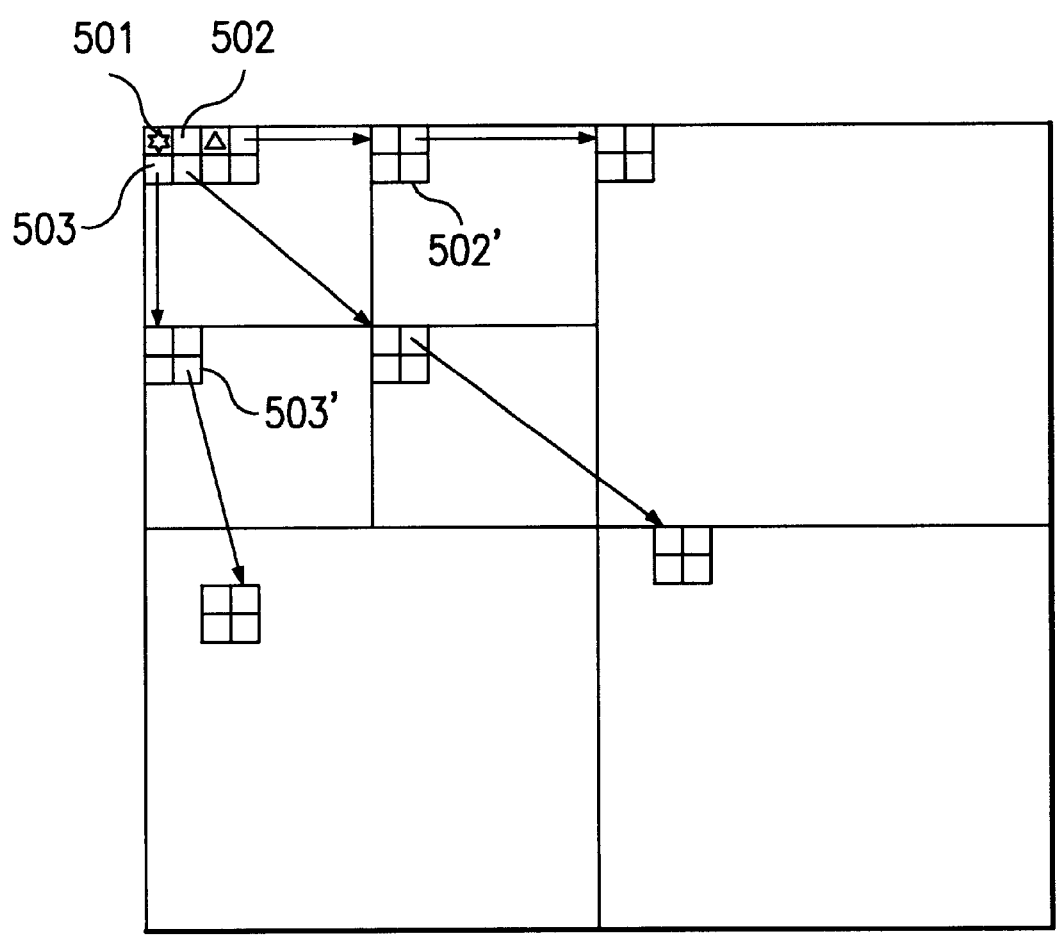
FIG. 5 is an illustration explaining the parent-children relationship in the rearranged DCT coefficients in a 2-level itpyramid structure shown in FIG. 4.

Since the important information in most pictures is included in the DC coefficient and the first several AC coefficients, the DC coefficient and the children 1, 2 and 3 of each DCT block are mapped in the highest subband of the memory as large as the picture size. The children {4,5,6,7}, {8,9,10,11}, {12,13,14,15} of parents 1, 2 and 3 respectively are mapped in the next subband, and the children of the parents in the next subband being mapped in the subband next to the next subband. FIG. 5 shows the relationship of the parent and children (501-502-502'-503-503) of the structure according to the present invention.

A difference between the structure of the present invention and the conventional wavelet 2-level pyramid structure is the frequency characteristic depending on the decomposition method. Unlike the conventional 2-level wavelet pyramid structure involving a wavelet transformation applied to only one low frequency band, the 2-level pyramid structure of the present invention is a structure obtained by independent wavelet transformation of four subbands decomposed by a uniform band decomposition method. In the present invention, the structure is rearranged in the lowest frequency band with parent-children relationship defined to use the spatial correlation of the DC coefficients.

Accordingly, the conventional 2-level wavelet pyramid structure reflects the low frequency component and not the mid frequency component, while the structure of the present invention reflects the mid frequency component rather than the low frequency component. This is preferable in a low bit rate transmission relative to a stepwise decomposition method because the high frequency component cannot be coded at a low bit rate without losing a decaying spectrum property which determines the efficiency of zerotree coding. Thus, reflecting the mid frequency component enhances the coding efficiency.

The DCT coefficients rearranged in the 2-level pyramid structure are quantized by an enhanced EZW method as a zerotree structure at the zerotree coding unit 202. The zerotree coding unit 202 performs a coding from the highest frequency band such that the most visually significant coefficient is first coded.

For the I frame, the average value of the DC coefficients is subtracted from the DC coefficients of each block to bias the DC coefficients for an efficient coding. The DC components (for each node) in the highest band are subtracted by an average of the DC components in the highest band. Because the DC values of the neighboring blocks have much spatial correlation with each other, the neighboring blocks are also biased with an average of the DC components in the neighboring blocks. The biasing of the neighboring blocks reduces the number of bits wasted in an unnecessary scanning during a zerotree coding and enhances a coding efficiency. However, because the DC values of the neighboring blocks for the P frame have less spatial correlation with each other, the DC average value is set to zero to bypass the biasing process.

The respective coefficients are compared with a series of threshold levels to code the position and sign of significant coefficients. The threshold level is determined by first taking a factorial of the maximum coefficient value less two and then reducing the factorial by half. The coefficient larger than the threshold level is considered as a significant coefficient, while the coefficient below the threshold level is considered insignificant. Three lists are used according to the significance, a List of Significant Sets (LIS), a List of Insignificant Pixels (LIP) and a List of Significant Pixels (LSP). The LIP is a set of the most significant nodes (root), and the LIS is a set of children for each parent in LIP.

The coding includes two steps, a sorting pass step to code the position and sign of significant information and a refinement pass step used to estimate the significant coefficients in succession. In the sorting pass, the LIP pixels are first compared with the current threshold level and if considered significant, the pixels are moved towards the LSP with sign output. The LIS coefficients are next sorted and is represented by one bit if considered insignificant. If the LIS coefficients are considered significant, the descendants of the current root are divided into subsets having the root and the sorting process is repeated.

Upon termination of a single sorting pass for the LIS and LIP, the LSP undergoes a refinement pass step by subsorting the coefficients into one bit. After a single refinement pass, the threshold value is divided by 2 and the flow of the process goes on to the next sorting pass step. Accordingly, the output bit stream of the zerotree coding unit 202 includes the result of significance test and refined bits. The determined results during the coding process are output with the same algorithm possessed by both coder and decoder. Thus the position of the significant coefficient need not be transferred separately.

The approximated value of the most significant coefficient is first transmitted and all significant coefficients are refined by one time to one bit, resulting in a progressive transmission selecting the most significant information. If the DCT is unitary like the wavelet and the euclidean norm is reserved, a gradual transmission would most reduce the Mean Square Error (MSE). On the other hand, the entropy coding unit 103 entropy-codes without loss of the significance test, signs and refinement symbols resulting from the course of the embedded zerotree coding step by utilizing an adaptive arithmetical coding method.

Since models are transmitted implicitly to a decoder, a preliminary information concerning the picture is not required and the statistic dependance between the significant coefficients may be used efficiently. The present invention uses an adaptive arithmetical coding algorithm such as Witten. Also, the coding apparatus of the present invention is an embedded coder allowing the bit rate control unit 111 to control the bit rate easily under any of the existing bit rate control algorithms based on the bit rate distortion.

Furthermore, the output of the zerotree coding unit 202 must be dequantized for purpose of motion prediction. To dequantize, the output of the zerotree coding unit 202 is inversely rearranged at the inverse rearrangement unit 203 which returns the output to the state before the reararranging by the rearrangement unit 201, i.e. to have a plural (for example, 64) uniformly decomposed subbands. The output of the inverse rearrangement unit 203 is subjected to IDCT at an IDCT unit 106 and output to an adder 107. The subsequent operation is analogous as discussed above in reference to FIG. 1.

The performance of the video coding apparatus of the present invention will not be evaluated in two cases, a still picture coding and an I-frame coding of H.263. For example, the present invention tested a MPEG4 "Hall Monitor" of QCIF(176×144) format and the brightness component Y of the first frame (I-frame). The bit rate control of the H.263 coder converts a Quantization Parameter (QP) from 6 to 31 in order to generate the coding bits. The coding bits are converted to a bit rate per pixel and the EZW, SPIHT and the coding according to the present invention are performed at the same bit rate per pixel. For the purpose of the example, a bit for the H.263 is defined as a bit required to code the brightness component Y, excluding the bits used to code the color components Cb and Cr.

Figure 6:
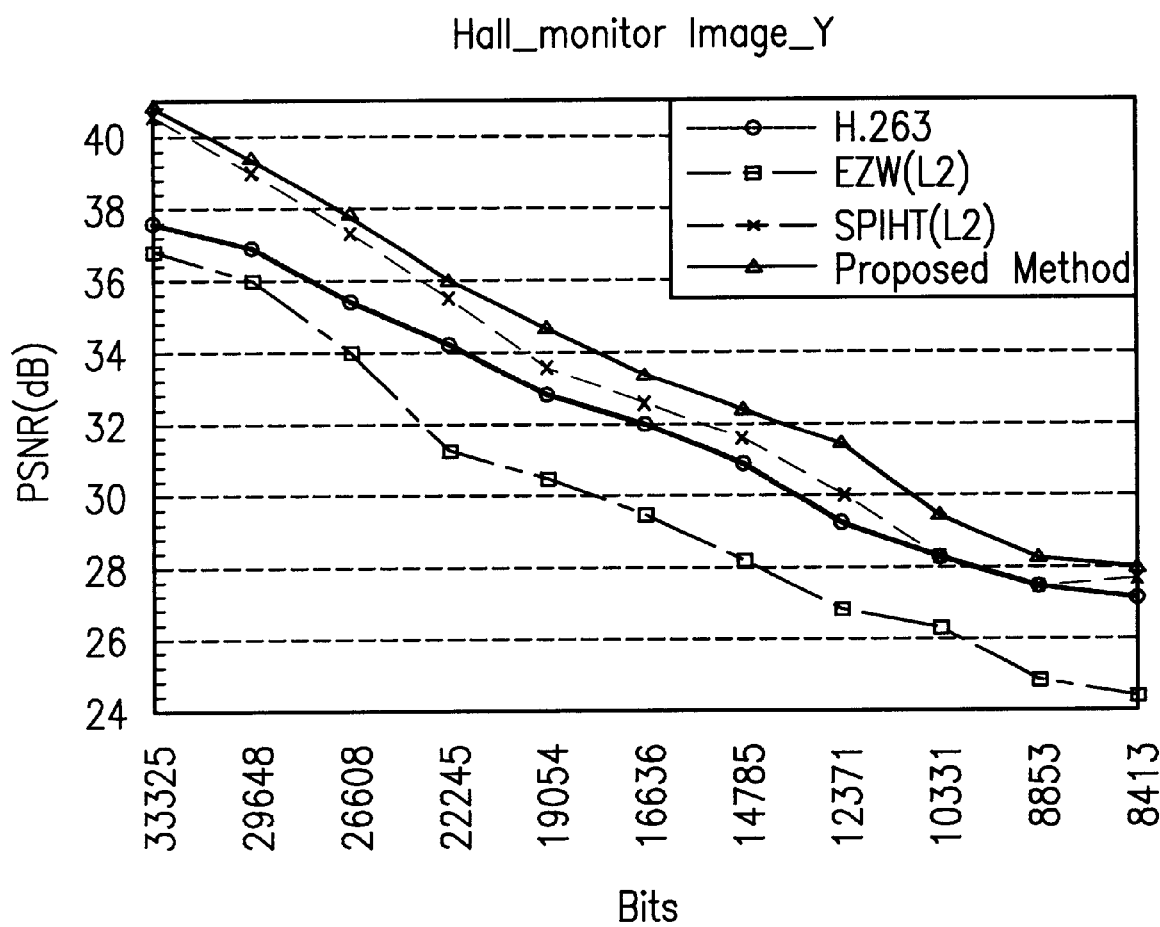
FIG. 6 is a graph showing the performance valuation for a comparison of the present invention and the prior art.

The filters of both the EZW and SPIHT coders are all biorthogonal filters used in the SPIHT coder. As the coder of the present invention has a two-level structure, the SPIHT and EZW codings are performed in the two levels to attain an embedded zerotree coding performance valuation. FIG. 6 shows a result of rearranged picture under different bit rate distortion performance for a valuation of the image quality of the MPEG4 test sequence "Hall Monitor".

Figure 7:
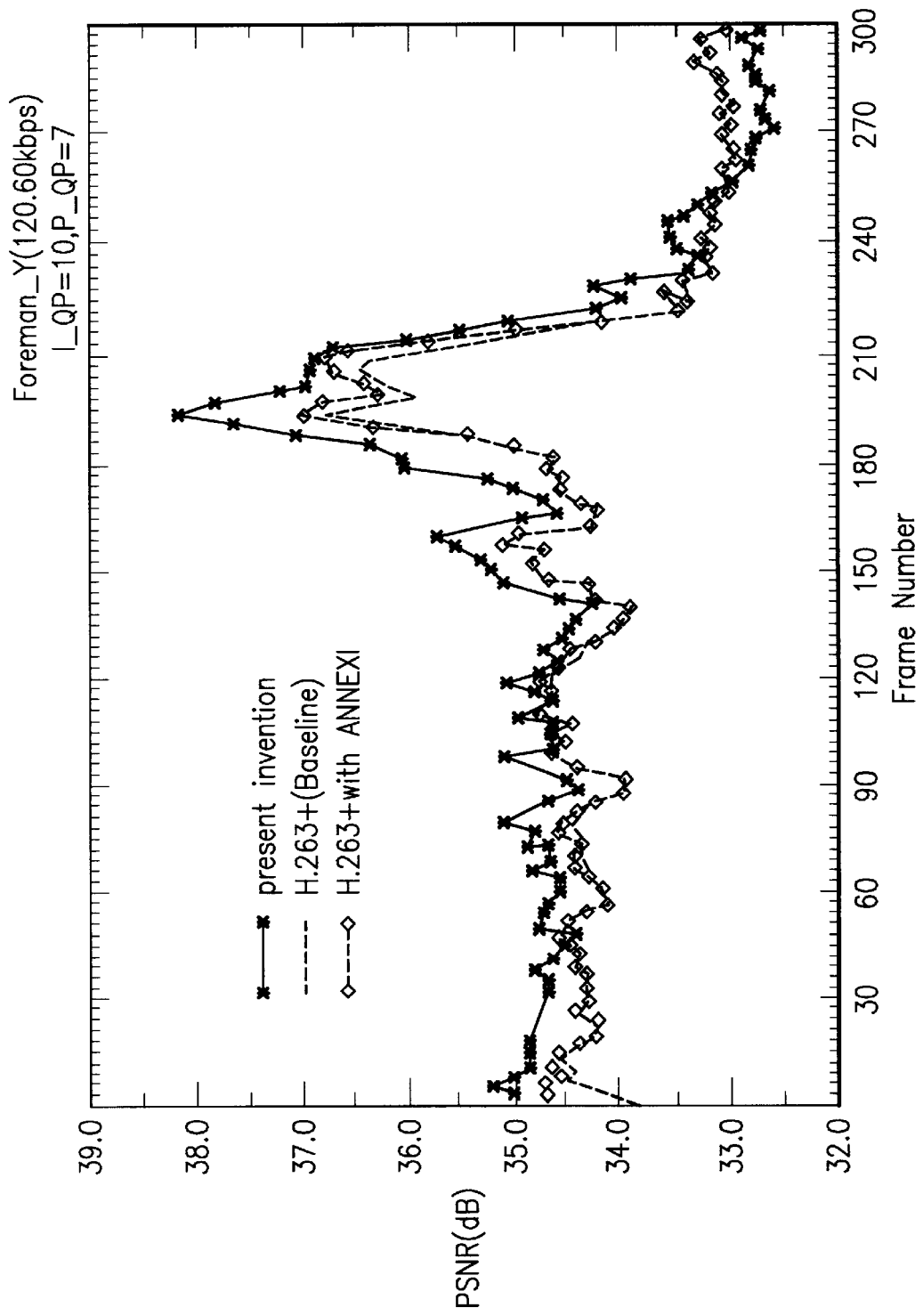
FIG. 7 is a graph showing the performance valuation for the present invention and the prior art in a different case.

Referring to FIG. 7, a graph comparing the coding performance of the conventional H.263+ coder and the coder of the present invention reveals that the coder of the present invention has a better bit rate distortion performance of I-frame coding than the H.263+ and H263+ video coder having ANNEX I. Thus, a coding may efficiency be attained even for an exposed or overlapped regions of a scene due to a scene change or rapid motion of an object.

Furthermore, the video coding apparatus of the present invention has a higher efficiency compared to the JPEG which is a standard for still picture compression, and to the improved JPEG and the other wavelet coders of such a level structure. Test results indicate that the DCT coefficient 2-level mapping method provides an efficient zerotree structure and performance in still picture compression comparable to the cited result of the JPEG and other typical wavelet embedded video coders.

As for decoding the encoded and transmitted image, the video decoder according to the present invention employs an analogous algorithm to the video coder. Thus, a video decoding of the present invention is achieved by performing a reverse process of the video coding. For example, the video decoding method of the present invention involves transforming the transmitted bit stream data in the order of significance priority, rearranging the transformed data in the original block unit frame region, and transforming the rearranged data from the frequency domain to the spatial domain. In other words, the transmitted bit stream data is transformed to an embedded zerotree structure, which is rearranged in a wavelet structure and subjected to IDCT for restoration.

A video decoding apparatus according to the present invention comprises a rearranging unit sorting an input bit stream data as the original image information according to the significance based on an embedded zerotree structure, and an IDCT unit using the sorted and rearranged data in block units to transform the DC and AC coefficients based on the frequency of the input bit stream data into information corresponding to the picture. Thus, the video decoder of the present invention undergoes a process analogous to the video coder of the present invention to perform the IDCT, the rearrangement into a wavelet structure and the embedded zerotree coding/decoding.

In another embodiment of the present invention, a video decoder has compatibility with the existing video decoders. Accordingly, the video decoding apparatus comprises both a first decoder executed in the existing decoding method as shown in FIG. 1 and a second decoder in the present decoding method shown in FIG. 2. The video decoding apparatus further comprises a means for selecting either one of the two decoding methods manually or automatically for a low transfer rate.

As described above, the video coding/decoding apparatus of the present invention uses the DCT and wavelet transform characteristic to rearrange the DCT coefficients in a 2-level pyramid structure, enabling an efficient use of the existing embedded zerotree coding method. The video coding and decoding involve a DCT transforming a picture data into an 8×8 block units, transforming the DCT coefficients in a wavelet structure to be sorted in the order of significance priority, performing an embedded zerotree coding of the sorted result for transmission, and decoding the transmitted image in the reverse process of the video coding.

The video coding/decoding according to the present invention has several advantages. First, the video coding/decoding is suitable in a low transfer rate video transmission for video telephone system through PSTN due to its compatibility and highly enhanced bit rate distortion performance. Second, the zerotree coding used in the present invention is facilitated to perform scalability characteristic and bit rate control. Thus, a bit stream may be truncated at any time if a bit budget is unavailability or a buffer exceeds a given threshold level. This characteristic is especially convenient for the browsing in a video database.

Third, an excellent bit rate distortion performance of the I frame coding provides a high coding efficiency for an exposed or overlapped region of a scene due to scene change or rapid movement of an object. Particularly, a higher coding efficiency may be attained for a natural image directly input by a camera with many intra macro blocks other than MPEG-4 or H.263 test image. The decoding apparatus of the present invention is actually applicable to a video coder with an enhanced overall efficiency because an efficient I-frame coding is an important factor determining the performance of a low transfer rate video coder.

Fourth, block distortion may be reduced by coding the DC coefficients and the components of the mid and high frequency. This enhances the energy compression efficiency of the DFD coding and increases the entire coding efficiency. Fifth, the present invention is suitable and is applicable to the requirements of MPEG-4, H.263++ and H.26L.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video coding method, comprising:
   (a) dividing an input frame into a plurality of blocks and transforming each block from a spatial domain to coefficients of a frequency domain;
   (b) sorting the transformed coefficients of the frequency domain, using a wavelet analysis applied separately to each of four bands of the transformed coefficients, and rearranging the sorted coefficients into an n-level mathematical pyramid representation in the order of a predetermined significance priority; and
   (c) coding the rearranged coefficients and outputting bit streams arranged in the order of the predetermined significance priority, wherein
   n is an integer greater than one.

2. A method of claim 1, wherein in the step (a), an input data is directly transformed to the frequency domain by a discrete cosine transform for an I frame, and a difference between a motion-compensated data and a current input data is transformed to the frequency domain by a discrete cosine transform for a P frame, wherein the motion-compensated data is obtained after motion compensation is predicted by using the previous I and P frames.

3. The method of claim 2, wherein coding the P frame further comprises:
   determining whether the P frame is an intra/inter mode;
   coding without motion compensation for the intra mode; and
   coding with motion compensation for the inter mode.

4. A method of claim 1, wherein in step (b), the predetermined significance priority is based upon the degree of information included for image reproduction.

5. The method of claim 1, wherein in step (b), the sorted coefficients are rearranged in a 2-level pyramid structure.

6. The method of claim 5, wherein step (b) further comprises:
   decomposing the coefficients into DC and AC coefficients based upon the frequency; and
   sorting and rearranging the coefficients of the lowest frequency band utilizing a spatial correlation of the DC coefficients.

7. A method of claim 6, wherein step (b) further comprises the step of reducing the DC coefficients by a mean value of the DC coefficients.

8. A method of claim 1, wherein in step (c), the information concerning the position and amplitude of the rearranged coefficients is coded.

9. A method of claim 8, wherein in step (c), the rearranged coefficients are compared with a series of predetermined thresholds to code the position and sign of significant coefficients.

10. A video coding apparatus, comprising:
- a DCT unit that divides an input frame into a plurality of blocks and transforms each block from a spatial domain to coefficients of a frequency domain;
- a quantizing unit that sorts the transformed coefficients using a wavelet analysis applied separately to each of four bands of the transformed coefficients and rearranges the sorted coefficients into an n-level mathematical pyramid representation in the order of a predetermined significance priority; and
- a coding unit that codes the rearranged coefficients and outputs bit streams arranged according to the predetermined significance priority, wherein
- n is an integer greater than one.

11. An apparatus of claim 10, wherein the DCT unit transforms an input data directly to the frequency domain by a discrete cosine transform for an I frame, and transforms a difference between a motion-compensated data and a current input data to the frequency domain by a discrete cosine transform for a P frame, and wherein the motion-compensated data is obtained after motion compensation is predicted by using the previous I and P frames.

12. An apparatus of claim 11, wherein when coding the P frame, the coding unit determines whether the P frame is a intra or inter mode, and wherein the coding unit codes without a motion estimation for the intra mode and codes with a motion estimation for the inter mode.

13. The apparatus of claim 10, wherein the quantizing unit arranges the sorted coefficients in a 2-level pyramid structure.

14. An apparatus of claim 10, wherein the coding unit codes the information concerning the position and amplitude of the rearranged coefficients.

15. An apparatus of claim 14, wherein the coding unit is a zerotree coding unit comparing the rearranged coefficients with a series of predetermined thresholds to code the position and sign of significant coefficients.

16. An apparatus of claim 15, wherein the zerotree coding unit comprises:
- a sorting pass unit coding the position and the sign of significant information; and
- a refinement pass unit estimating the significant coefficients in succession.

17. A video coding apparatus comprising:
- a DCT unit dividing an input frame into a plurality of blocks and transforming each block from a spatial domain to a frequency domain;
- a first coding unit quantizing the transformed coefficients by a zigzag scanning and run-length coding;
- a quantizing unit sorting the transformed coefficients of the frequency domain, using a wavelet analysis applied separately to each of four bands of the transformed coefficients, and rearranging the sorted coefficients into n-level pyramid representation in the order of a predetermined significance priority, wherein n is an integer greater than one;
- a second coding unit coding information concerning a position and an amplitude of the rearranged coefficients, and outputting bit streams arranged according to the predetermined significance; and
- a selection unit selecting one of the first or second coding unit.

18. An apparatus of claim 17, wherein the predetermined significance priority is based upon the degree of information included for image reproduction.

19. A video decoding method comprising:
- transforming a transmitted bit stream data in the order of a predetermined significance priority;
- rearranging the data transformed into the original block unit frame region using an inverse uniform band wavelet analysis applied to an n-level mathematical pyramid representation of the data; and
- transforming the rearranged data from a frequency domain to a spatial domain, wherein
- n is an integer greater than one.

20. A video decoding apparatus, comprising:
- a dequantizing unit that sorts input data using an inverse uniform band wavelet analysis applied to an n-level mathematical pyramid representation of the input data and rearranges the sorted input data into original image information in the order of a predetermined significance priority based on an embedded zerotree structure; and
- an IDCT unit that uses the rearranged data to transform DC and AC coefficients based on the frequency of the input data into information corresponding to a picture, wherein
- n is an integer greater than one.

* * * * *